G. B. LIVINGOOD.
FRUIT STRAINER.
APPLICATION FILED OCT. 15, 1912.
1,053,838.
Patented Feb. 18, 1913.
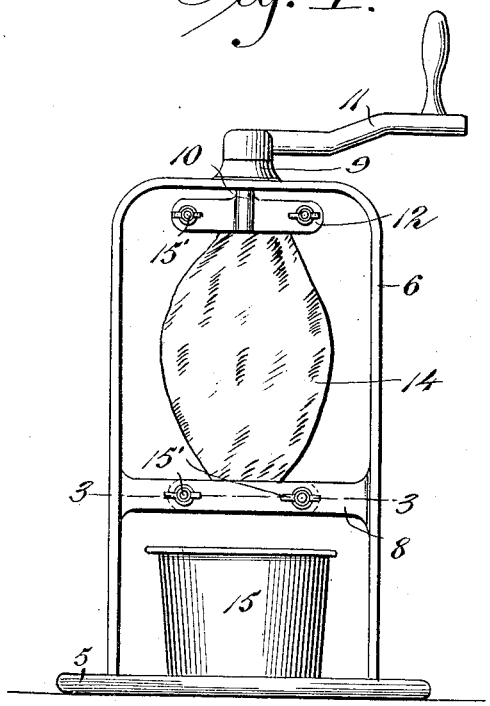
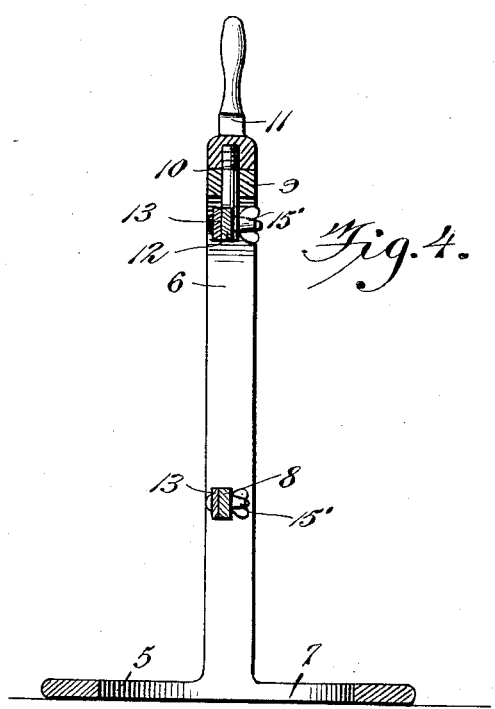
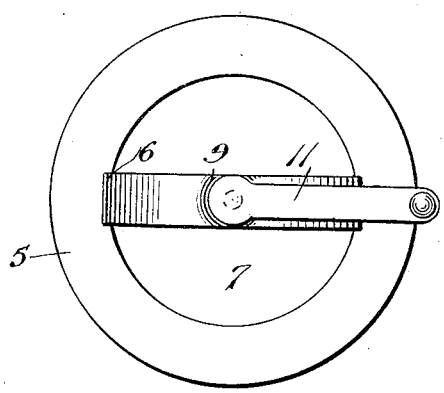
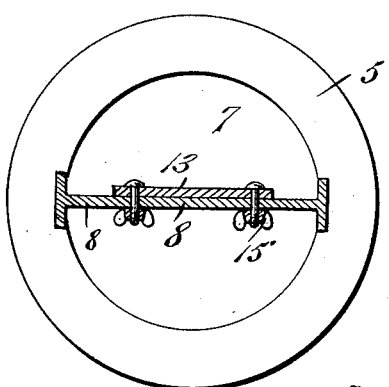
Inventor
G. B. Livingood
By Victor J. Evans
Attorney
Witnesses

UNITED STATES PATENT OFFICE.

GEORGE B. LIVINGOOD, OF POTTSTOWN, PENNSYLVANIA.

FRUIT-STRAINER.

1,053,838.   Specification of Letters Patent.   Patented Feb. 18, 1913.

Application filed October 15, 1912. Serial No. 725,884.

*To all whom it may concern:*

Be it known that I, GEORGE B. LIVINGOOD, a citizen of the United States, residing at Pottstown, in the county of Montgomery and State of Pennsylvania, have invented new and useful Improvements in Fruit-Strainers, of which the following is a specification.

The invention relates to a vegetable or fruit squeezer and more particularly to the class of fruit strainers.

The primary object of the invention is the provision of a fruit strainer wherein a quantity of fruit may be squeezed and strained without leaving the slightest stain on the hand or hands of the operator.

Another object of the invention is the provision of a device of this character wherein all of the juices will be extracted from the material being strained, thus leaving only a residue of dry waste, without the liability of solid matter mixing with the juice extracted.

A further object of the invention is the provision of a device of this character which can be readily cleaned and therefore will be rendered thoroughly sanitary, there being no parts or screens to get out of order.

A still further object of the invention is the provision of a device of this character which is simple in construction, reliable and efficient in operation, durable, strong and also one which may be manufactured at a mimimum expense.

With these and other objects in view the invention consists in the construction, combination and arrangement of parts which will be hereinafter more fully described, illustrated in the accompanying drawing.

In the drawing: Figure 1, is a side elevation of the device constructed in accordance with the invention. Fig. 2, is a top plan view of the same. Fig. 3, is a horizontal sectional view on the line 3—3 of Fig. 1. Fig. 4, is a vertical longitudinal sectional view of the device.

Similar reference characters indicate corresponding parts throughout the several views in the drawing.

Referring to the drawings by numerals the device comprises a base 5, which is in this invention of circular shape, although the same may be of any other desirable shape, and has rising vertically therefrom an inverted U-shaped frame 6, which is integrally formed with said base. The said base 5, is formed with a central seat 7, to accommodate a receptacle for receiving the juice which is extracted from fruit in a manner presently described.

Provided transversely of the frame spaced above the base, 5, is a cross bar 8, while formed centrally of the said frame 6 at the top thereof is a perforated bearing boss 9, in which is journaled the vertical stem 10 of a rotatable crank handle 11, the stem 10 being formed with a cross head 12, on which and the cross bar 8 are adjustably secured clamps 13, for the detachable securing of a fabric bag or sack 14 thereto. In this bag or sack 14 is adapted to be placed fruit to be strained by the turning of the said crank handle 11, which twists the said sack or bag thereby squeezing the contents of the same for the extracting of the juice therefrom, the same being caught in the receptacle 15 mounted on the base.

The solid matter of the fruit will be retained in the bag or sack 14, so as not to mix with the juices extracted from the contents thereof. The clamps are adjusted by means of winged adjusting screws 15′ which are engaged in the clamps and also engaged in the bar 8 and head 12, respectively.

What is claimed is:

A device of the class described comprising an inverted U-shaped frame, a base integrally formed with the frame and having an open center adapted to receive a receptacle, a cross bar formed in the frame intermediate the ends thereof, a rotatable clamp having a stem journaled centrally in the top of the frame, a clamp carried by the cross bar, a bag adapted to be detachably connected in the said clamp, and a hand crank secured to the stem of the rotatable clamp for turning the same, each of said clamps being provided with adjustable clamping bars.

In testimony whereof I affix my signature in presence of two witnesses.

GEORGE B. LIVINGOOD.

Witnesses:
IRVIN W. MERCH,
W. W. BENDLINGER.

Copies of this patent may be obtained for five cents each, by addressing the "Commissioner of Patents, Washington, D. C."